(12) United States Patent
Steiner et al.

(10) Patent No.: US 8,537,168 B1
(45) Date of Patent: Sep. 17, 2013

(54) METHOD AND SYSTEM FOR DEFERRED COVERAGE MASK GENERATION IN A RASTER STAGE

(75) Inventors: Walter R. Steiner, Flagler Beach, FL (US); Jeffrey R. Sewall, Pleasanton, CA (US)

(73) Assignee: NVIDIA Corporation, Santa Clara, CA (US)

( * ) Notice: Subject to any disclaimer, the term of this patent is extended or adjusted under 35 U.S.C. 154(b) by 470 days.

(21) Appl. No.: 11/592,790

(22) Filed: Nov. 2, 2006

(51) Int. Cl.
*G06T 1/20* (2006.01)
*G09G 5/00* (2006.01)

(52) U.S. Cl.
USPC ............ 345/506; 345/622; 345/624; 345/626

(58) Field of Classification Search
USPC .......................... 345/506, 626, 426, 622, 624
See application file for complete search history.

(56) References Cited

U.S. PATENT DOCUMENTS

| | | | |
|---|---|---|---|
| 4,620,217 A | 10/1986 | Songer | |
| 4,648,045 A | 3/1987 | Demetrescu | |
| 4,667,308 A | 5/1987 | Hayes et al. | |
| 4,700,319 A | 10/1987 | Steiner | |
| 4,862,392 A | 8/1989 | Steiner | |
| 4,901,224 A | 2/1990 | Ewert | |
| 5,185,856 A | 2/1993 | Alcorn et al. | |
| 5,268,995 A | 12/1993 | Diefendorff et al. | |
| 5,270,687 A | 12/1993 | Killebrew, Jr. | |
| 5,285,323 A | 2/1994 | Hetherington et al. | |
| 5,357,604 A | 10/1994 | San et al. | |
| 5,392,393 A | 2/1995 | Deering | |
| 5,487,022 A | 1/1996 | Simpson et al. | |
| 5,488,687 A * | 1/1996 | Rich ............................ 345/563 |
| 5,491,496 A | 2/1996 | Tomiyasu | |
| 5,557,298 A | 9/1996 | Yang et al. | |
| 5,577,213 A | 11/1996 | Avery et al. | |
| 5,579,473 A | 11/1996 | Schlapp et al. | |
| 5,579,476 A | 11/1996 | Cheng et al. | |
| 5,581,721 A | 12/1996 | Wada et al. | |
| 5,600,584 A | 2/1997 | Schlafly | |
| 5,604,824 A | 2/1997 | Chui et al. | |

(Continued)

FOREIGN PATENT DOCUMENTS

| CN | 1954338 | 5/2004 |
|---|---|---|
| CN | 101091203 | 5/2004 |

(Continued)

OTHER PUBLICATIONS

Final Office Action Dated Mar. 6, 2008: U.S. Appl. No. 10/845,662.

(Continued)

*Primary Examiner* — Aaron M Richer
*Assistant Examiner* — Robert Craddock

(57) ABSTRACT

A method and system for deferred coverage mask generation in a raster stage of a graphics processor. The method includes receiving a graphics primitive for rasterization in a raster stage of a graphics processor and performing a bounding box test on the graphics primitive to define a bounding rectangle for the graphics primitive. A combined coverage mask is then generated after the completion of the bounding box test. The combined coverage mask indicates a plurality of pixels that are covered by the graphics primitive. The combined coverage mask is divided into a plurality of sub-portions. The sub-portions are allocated to a plurality of raster components to determine sub-pixel coverage for the sub-portions.

17 Claims, 7 Drawing Sheets

(56) References Cited

U.S. PATENT DOCUMENTS

| | | | |
|---|---|---|---|
| 5,613,050 A | 3/1997 | Hochmuth et al. | |
| 5,655,132 A | 8/1997 | Watson | |
| 5,701,444 A * | 12/1997 | Baldwin | 345/506 |
| 5,748,202 A | 5/1998 | Nakatsuka et al. | |
| 5,764,228 A | 6/1998 | Baldwin | |
| 5,777,628 A | 7/1998 | Buck-Gengler | |
| 5,808,617 A | 9/1998 | Kenworthy et al. | |
| 5,818,456 A | 10/1998 | Cosman et al. | |
| 5,831,640 A | 11/1998 | Wang et al. | |
| 5,844,569 A | 12/1998 | Eisler et al. | |
| 5,850,572 A | 12/1998 | Dierke | |
| 5,864,342 A | 1/1999 | Kajiya et al. | |
| 5,941,940 A | 8/1999 | Prasad et al. | |
| 5,977,977 A | 11/1999 | Kajiya et al. | |
| 5,995,121 A | 11/1999 | Alcorn et al. | |
| 6,002,410 A | 12/1999 | Battle | |
| 6,118,452 A | 9/2000 | Gannett | |
| 6,166,743 A | 12/2000 | Tanaka | |
| 6,173,366 B1 | 1/2001 | Thayer et al. | |
| 6,222,550 B1 | 4/2001 | Rosman et al. | |
| 6,229,553 B1 | 5/2001 | Duluk, Jr. et al. | |
| 6,259,460 B1 * | 7/2001 | Gossett et al. | 345/552 |
| 6,259,461 B1 | 7/2001 | Brown | |
| 6,288,730 B1 | 9/2001 | Duluk, Jr. et al. | |
| 6,313,846 B1 | 11/2001 | Fenney et al. | |
| 6,333,744 B1 | 12/2001 | Kirk et al. | |
| 6,351,806 B1 | 2/2002 | Wyland | |
| 6,353,439 B1 | 3/2002 | Lindholm et al. | |
| 6,407,740 B1 | 6/2002 | Chan | |
| 6,411,130 B1 | 6/2002 | Parikh et al. | |
| 6,411,301 B1 | 6/2002 | Parikh et al. | |
| 6,417,851 B1 * | 7/2002 | Lindholm et al. | 345/426 |
| 6,466,222 B1 | 10/2002 | Kao et al. | |
| 6,496,537 B1 | 12/2002 | Kranawetter et al. | |
| 6,516,032 B1 | 2/2003 | Heirich et al. | |
| 6,525,737 B1 | 2/2003 | Duluk, Jr. et al. | |
| 6,526,430 B1 | 2/2003 | Hung et al. | |
| 6,542,971 B1 | 4/2003 | Reed | |
| 6,557,022 B1 | 4/2003 | Sih et al. | |
| 6,597,363 B1 | 7/2003 | Duluk, Jr. et al. | |
| 6,604,188 B1 | 8/2003 | Coon et al. | |
| 6,624,818 B1 | 9/2003 | Mantor et al. | |
| 6,636,214 B1 | 10/2003 | Leather et al. | |
| 6,636,221 B1 | 10/2003 | Morein | |
| 6,636,223 B1 | 10/2003 | Morein | |
| 6,664,958 B1 | 12/2003 | Leather et al. | |
| 6,670,955 B1 | 12/2003 | Morein | |
| 6,693,643 B1 | 2/2004 | Trivedi et al. | |
| 6,717,577 B1 | 4/2004 | Cheng et al. | |
| 6,731,288 B2 | 5/2004 | Parsons et al. | |
| 6,734,861 B1 | 5/2004 | Van Dyke et al. | |
| 6,745,390 B1 | 6/2004 | Reynolds et al. | |
| 6,778,181 B1 | 8/2004 | Kilgariff et al. | |
| 6,806,886 B1 | 10/2004 | Zatz | |
| 6,819,331 B2 | 11/2004 | Shih et al. | |
| 6,839,828 B2 | 1/2005 | Gschwind et al. | |
| 6,879,328 B2 | 4/2005 | Deering | |
| 6,912,695 B2 | 6/2005 | Ernst et al. | |
| 6,924,808 B2 | 8/2005 | Kurihara et al. | |
| 6,947,053 B2 | 9/2005 | Malka et al. | |
| 6,980,209 B1 | 12/2005 | Donham et al. | |
| 6,980,222 B2 | 12/2005 | Marion et al. | |
| 6,999,100 B1 | 2/2006 | Leather et al. | |
| 7,034,828 B1 | 4/2006 | Drebin et al. | |
| 7,042,462 B2 | 5/2006 | Kim et al. | |
| 7,145,566 B2 | 12/2006 | Karlov | |
| 7,158,141 B2 | 1/2007 | Chung et al. | |
| 7,187,383 B2 * | 3/2007 | Kent | 345/505 |
| 7,257,814 B1 | 8/2007 | Melvin et al. | |
| 7,280,112 B1 | 10/2007 | Hutchins | |
| 7,298,375 B1 | 11/2007 | Hutchins | |
| 7,450,120 B1 * | 11/2008 | Hakura et al. | 345/421 |
| 7,477,260 B1 | 1/2009 | Nordquist | |
| 7,659,909 B1 | 2/2010 | Hutchins | |
| 7,710,427 B1 | 5/2010 | Hutchins et al. | |
| 7,928,990 B2 | 4/2011 | Jiao et al. | |
| 7,941,645 B1 | 5/2011 | Riach et al. | |
| 7,969,446 B2 | 6/2011 | Hutchins et al. | |
| 2002/0105519 A1 * | 8/2002 | Lindholm et al. | 345/426 |
| 2002/0126126 A1 * | 9/2002 | Baldwin | 345/557 |
| 2002/0129223 A1 | 9/2002 | Takayama et al. | |
| 2002/0169942 A1 | 11/2002 | Sugimoto | |
| 2003/0115233 A1 | 6/2003 | Hou et al. | |
| 2003/0189565 A1 * | 10/2003 | Lindholm et al. | 345/418 |
| 2004/0012597 A1 | 1/2004 | Zatz et al. | |
| 2004/0012599 A1 | 1/2004 | Laws | |
| 2004/0012600 A1 | 1/2004 | Deering et al. | |
| 2004/0024260 A1 | 2/2004 | Winkler et al. | |
| 2004/0078504 A1 | 4/2004 | Law et al. | |
| 2004/0100474 A1 * | 5/2004 | Demers et al. | 345/582 |
| 2004/0114813 A1 | 6/2004 | Boliek et al. | |
| 2004/0119710 A1 | 6/2004 | Piazza et al. | |
| 2004/0126035 A1 | 7/2004 | Kyo | |
| 2004/0130552 A1 * | 7/2004 | Duluk et al. | 345/506 |
| 2004/0246260 A1 | 12/2004 | Kim et al. | |
| 2005/0122330 A1 | 6/2005 | Boyd et al. | |
| 2005/0134588 A1 | 6/2005 | Aila et al. | |
| 2005/0135433 A1 | 6/2005 | Chang et al. | |
| 2005/0162436 A1 | 7/2005 | Van Hook et al. | |
| 2005/0223195 A1 | 10/2005 | Kawaguchi | |
| 2005/0231506 A1 | 10/2005 | Simpson et al. | |
| 2005/0237337 A1 | 10/2005 | Leather et al. | |
| 2005/0280655 A1 | 12/2005 | Hutchins et al. | |
| 2006/0007234 A1 | 1/2006 | Hutchins et al. | |
| 2006/0028469 A1 | 2/2006 | Engel | |
| 2006/0152519 A1 | 7/2006 | Hutchins et al. | |
| 2006/0155964 A1 | 7/2006 | Totsuka | |
| 2006/0177122 A1 | 8/2006 | Yasue | |
| 2006/0288195 A1 | 12/2006 | Ma et al. | |
| 2007/0279408 A1 | 12/2007 | Zheng et al. | |
| 2007/0285427 A1 | 12/2007 | Morein et al. | |

FOREIGN PATENT DOCUMENTS

| | | |
|---|---|---|
| EP | 1665165 | 5/2004 |
| EP | 1745434 | 5/2004 |
| EP | 1771824 | 5/2004 |
| JP | 62080785 | 4/1987 |
| JP | 05150979 | 6/1993 |
| JP | 11053187 | 2/1999 |
| JP | 2000047872 | 2/2000 |
| JP | 2002073330 | 3/2002 |
| JP | 2002171401 | 6/2002 |
| JP | 2004199222 | 7/2004 |
| JP | 2006196004 | 7/2006 |
| JP | 2008161169 | 7/2008 |
| WO | 2005112592 | 5/2004 |
| WO | 2006007127 | 5/2004 |
| WO | 2005114582 | 12/2005 |
| WO | 2005114646 | 12/2005 |

OTHER PUBLICATIONS

Non-Final Office Action Dated Sep. 26, 2008: U.S. Appl. No. 10/845,662.
Final Office Action Dated Apr. 22, 2009: U.S. Appl. No. 10/845,662.
Non-Final Office Action Dated Dec. 29, 2009: U.S. Appl. No. 10/845,662.
Final Office Action Dated Sep. 7, 2009: U.S. Appl. No. 10/845,662.
Non-Final Office Action Dated Apr. 22, 2011: U.S. Appl. No. 10/845,662.
Non-Final Office Action Dated Mar. 30, 2007: U.S. Appl. No. 10/846,192.
Final Office Action Dated Nov. 6, 2007: U.S. Appl. No. 10/846,192.
Non-Final Office Action Dated May 16, 2008: U.S. Appl. No. 10/846,192.
Non-Final Office Action Dated Jan. 12, 2009: U.S. Appl. No. 10/846,192.
Final Office Action Dated Jun. 5, 2009: U.S. Appl. No. 10/846,192.
Non-Final Office Action Dated Jan. 8, 2010: U.S. Appl. No. 10/846,192.
Final Office Action Dated Sep. 7, 2010: U.S. Appl. No. 10/846,192.
Non-Final Office Action Dated Apr. 26, 2011: U.S. Appl. No. 10/846,192.

Hutchins et al, Patent Application Entitled "A Unified Data Fetch Graphics Processing System and Method", U.S. Appl. No. 10/845,986, filed May 14, 2004.
Processing System and Method, U.S. Appl. No. 10/845,986, filed May 14, 2004.
Hutchins et al, Patent Application Entitled "An Early Kill Removal Graphics Processing System and Method", U.S. Appl. No. 10/845,662, filed May 14, 2004.
Processing System and Method, U.S. Appl. No. 10/845,662, filed May 14, 2004.
Pixar, Inc.; PhotoRealistic RenderMan 3.9 Shading Language Extensions, Sep. 1999.
PCT Notificaiton of Transmittal of The International Search Report and The Written Opinion of the International Searching Authority, or the Declaration. PCT/US05/17032; Applicant NVIDA Corporation; Mail Date Nov. 9, 2005.
PCT Notificaiton of Transmittal of The International Search Report or the Declaration. PCT/US05/17526; Applicant Hutchins, Edward A; Mail Date Jan. 17, 2006.
PCT Notificaiton of Transmittal of The International Search Report and The Written Opinion of the International Searching Authority, or the Declaration. PCT/US05/17031; Applicant NVIDA Corporation; Mail Date Feb. 9, 2007.
Non-Final Office Action Dated May 3, 2005; U.S. Appl. No. 10/846,208.
Final Office Action Dated Jan. 31, 2006; U.S. Appl. No. 10/846,208.
Non-Final Office Action Dated Oct. 19, 2006; U.S. Appl. No. 10/846,208.
Final Office Action Dated Jul. 27, 2007; U.S. Appl. No. 10/846,208.
Non-Final Office Action Dated Jan. 14, 2008; U.S. Appl. No. 10/846,208.
Final Office Action Dated Sep. 22, 2008; U.S. Appl. No. 10/846,208.
Non-Final Office Action Dated May 1, 2009; U.S. Appl. No. 10/846,208.
Final Office Action Dated Jan. 12, 2010; U.S. Appl. No. 10/846,208.
"Sideband" http://www.encylopedia.com/html/s1/sideband.asp.
Final Office Action Dated Feb. 15, 2011; U.S. Appl. No. 10/846,208.
Non-Final Office Action Dated Sep. 27, 2011; U.S. Appl. No. 10/846,208.
Non-Final Office Action Dated Dec. 23, 2005; U.S. Appl. No. 10/846,201.
Final Office Action Dated Aug. 11, 2006; U.S. Appl. No. 10/846,201.
Non-Final Office Action Dated May 3, 2007; U.S. Appl. No. 10/846,201.
Final Office Action Dated Jan. 11, 2008; U.S. Appl. No. 10/846,201.
Non-Final Office Action Dated Jul. 17, 2008; U.S. Appl. No. 10/846,201.
Final Office Action Dated Feb. 12, 2009; U.S. Appl. No. 10/846,201.
Non-Final Office Action Dated Aug. 21, 2009; U.S. Appl. No. 10/846,201.
Final Office Action Dated Jun. 4, 2010; U.S. Appl. No. 10/846,201.
Non-Final Office Action Dated Oct. 27, 2010; U.S. Appl. No. 10/846,201.
Final Office Action Dated May 9, 2011; U.S. Appl. No. 10/846,201.
Non-Final Office Action Dated Dec. 30, 2011; U.S. Appl. No. 10/846,201.
Non-Final Office Action Dated Mar. 29, 2007; U.S. Appl. No. 10/845,986.
Final Office Action Dated Nov. 26, 2007; U.S. Appl. No. 10/845,986.
Non-Final Office Action Dated Jun. 17, 2008; U.S. Appl. No. 10/845,986.
Non-Final Office Action Dated Jan. 9, 2009; U.S. Appl. No. 10/845,986.
Final Office Action Dated Sep. 22, 2009; U.S. Appl. No. 10/845,986.
Non-Final Office Action Dated Mar. 9, 2010; U.S. Appl. No. 10/845,986.
Final Office Action Dated Sep. 28, 2010; U.S. Appl. No. 10/845,986.
Non-Final Office Action Dated May 9, 2011; U.S. Appl. No. 10/845,986.
Non-Final Office Action Dated May 23, 2005; U.S. Appl. No. 10/845,664.
Non-Final Office Action Dated Dec. 16, 2005; U.S. Appl. No. 10/845,664.
Final Office Action Dated Jul. 26, 2006; U.S. Appl. No. 10/845,664.
Non-Final Office Action Dated Mar. 20, 2007; U.S. Appl. No. 10/845,664.
Final Office Action Dated Nov. 29, 2007; U.S. Appl. No. 10/845,664.
Non-Final Office Action Dated May 15, 2008; U.S. Appl. No. 10/845,664.
Non-Final Office Action Dated Jan. 13, 2009; U.S. Appl. No. 10/845,664.
Non-Final Office Action Dated Aug. 21, 2009; U.S. Appl. No. 10/845,664.
Non-Final Office Action Dated Jun. 11, 2006; U.S. Appl. No. 10/845,664.
Final Office Action Dated Feb. 1, 2011; U.S. Appl. No. 10/845,664.
Notice of Allowance Dated Aug. 4, 2011; U.S. Appl. No. 10/845,664.
Non-Final Office Action Dated Mar. 29, 2007; U.S. Appl. No. 10/845,662.
Battle, J., Patent Application Entitled "Arbitrary Size Texture Palettes for Use in Graphics Systems", U.S. Appl. No. 10/845,664, filed May 14, 2004.
Hutchins et al, Patent Application Entitled "A Single Thread Graphics Processing System and Method", U.S. Appl. No. 10/846,192, filed May 14, 2004.
Wolfe A, et al., "A Superscalar 3D graphics engine", MICRO-32. Proceedings of the 32nd annual ACM/IEEE International Symposium on Microarchitecture. Haifa, Israel, Nov. 16-18, 1999; (1250EP).
Zaharieva-Stoyanova E I: "Data-flow analysis in superscalar computer architecture execution," Tellecommunications in Modern Satellite, Cable and Broadcasting Services, 2003 (1250EP).
Non-Final OA Mailed on Aug. 3, 2010; U.S. Appl. No. 10/846,208.
Final Office Action Mailed on Apr. 20, 2012; Appl. No. 1086208.
Non-Final OA Mailed on Sep. 10, 2012; U.S. Appl. No. 10/846,208.
Notice of Allowance Mailed Jul. 5, 2012; U.S. Appl. No. 10/846,201.
Notice of Allowance Mailed Oct. 10, 2012; U.S. Appl. No. 10/846,201.
Notice of Allowance Mailed Jan. 16, 2012; U.S. Appl. No. 10/845,986.
Notice of Allowance Mailed Apr. 25, 2012; U.S. Appl. No. 10/845,986.
Notice of Allowance Mailed Aug. 1, 2012; U.S. Appl. No. 10/845,986.
Notice of Allowance Mailed Oct. 9, 2012; U.S. Appl. No. 10/845,986.
Notice of Allowance Mailed Nov. 21, 2011; U.S. Appl. No. 10/845,664.
Notice of Allowance Mailed Feb. 27, 2012; U.S. Appl. No. 10/845,664.
Notice of Allowance Mailed Jun. 19, 2012; U.S. Appl. No. 10/845,664.
Final Office Action Mailed Dec. 30, 2011; U.S. Appl. No. 10/845,662.
Non-Final Office Action Mailed Aug. 28, 2012; U.S. Appl. No. 10/845,662.
Notice of Allowance Mailed Dec. 1, 2011; U.S. Appl. No. 10/846,192.
Notice of Allowance Mailed Mar. 15, 2012; U.S. Appl. No. 10/846,192.
Notice of Allowance Mailed Jul. 12, 2012; U.S. Appl. No. 10/846,192.
Notice of Allowance Mailed Oct. 22, 2012; U.S. Appl. No. 10/846,192.
Non-Final Office Action Mailed Mar. 16, 2011; U.S. Appl. No. 12/002,732.
Final Office Action Mailed Nov. 2, 2011; U.S. Appl. No. 12/002,732.
Non-Final Office Action Mailed May 10, 2012; U.S. Appl. No. 12/002,732.
Final Office Action Mailed Oct. 10, 2012; U.S. Appl. No. 12/002,732.
The Free Online Dictionary, Thesaurus and Encyclopedia, definition for cache; http://www.thefreedictionary.com/cache; retrieved Aug. 17, 2012.
"Interleaved Memory." Dec. 26, 2002. http://www.webopedia.com/TERM/I/interleaved_memory.html.

Pirazzi, Chris. "Fields, F1/F2, Interleave, Field Dominance and More." Nov. 4, 2001. http://lurkertech.com/lg/dominance.html.
Hennessy, et al., Computer Organization and Design: The Hardware/Software Interface, 1997, Section 6.5.
Moller, et al.; Real-Time Rendering, 2nd ed., 2002, A K Peteres Ltd., pp. 92-99, 2002.
Hollasch; IEEE Standard 754 Floating Point Numbers; http://steve.hollasch.net/cgindex/coding/ieeefloat.html; dated Feb. 24, 2005; retrieved Oct. 21, 2010.
Microsoft; (Complete) Tutorial to Understand IEEE Floating-Point Errors; http://support.microsoft.com/kb/42980; dated Aug. 16, 2005; retrieved Oct. 21, 2010.
FOA Apr. 22, 2013.

NOA Feb. 13, 2013.
NOA Jan. 30, 2013.
NOA Mar. 1, 2013.
FOA Mar. 27, 2013.
OA Apr. 22, 2013.
OA Sep. 21, 2010.
FOA Feb. 14, 2011.
FOA Jun. 22, 2011.
OA Mar. 27, 2012.
FOA Jul. 18, 2012.
Examiner's Answer Jan. 11, 2013.

* cited by examiner

METHOD AND SYSTEM FOR DEFERRED COVERAGE MASK GENERATION IN A RASTER STAGE

FIELD OF THE INVENTION

The present invention is generally related to hardware accelerated graphics computer systems.

BACKGROUND OF THE INVENTION

Recent advances in computer performance have enabled graphic systems to provide more realistic graphical images using personal computers, home video game computers, handheld devices, and the like. In such graphic systems, a number of procedures are executed to "render" or draw graphic primitives to the screen of the system. A "graphic primitive" is a basic component of a graphic picture, such as a point, line, polygon, or the like. Rendered images are formed with combinations of these graphic primitives. Many procedures may be utilized to perform 3-D graphics rendering.

Specialized graphics processing units (e.g., GPUs, etc.) have been developed to optimize the computations required in executing the graphics rendering procedures. The GPUs are configured for high-speed operation and typically incorporate one or more rendering pipelines. Each pipeline includes a number of hardware-based functional units that are optimized for high-speed execution of graphics instructions/data, where the instructions/data are fed into the front end of the pipeline and the computed results emerge at the back end of the pipeline. The hardware-based functional units, cache memories, firmware, and the like, of the GPU are optimized to operate on the low-level graphics primitives (e.g., comprising "points", "lines", "triangles", etc.) and produce real-time rendered 3-D images.

The real-time rendered 3-D images are generated using raster display technology. Raster display technology is widely used in computer graphics systems, and generally refers to the mechanism by which the grid of multiple pixels comprising an image are influenced by the graphics primitives. For each primitive, a typical rasterization system generally steps from pixel to pixel and determines whether or not to "render," or write a given pixel into a frame buffer or pixel map, as per the contribution of the primitive. This, in turn, determines how to write the data to the display buffer representing each pixel.

Once the primitives are rasterized into their constituent pixels, these pixels are then processed in pipeline stages subsequent to the rasterization stage where the rendering operations are performed. Generally, these rendering operations assign a color to each of the pixels of a display in accordance with the degree of coverage of the primitives comprising a scene. The per pixel color is also determined in accordance with texture map information that is assigned to the primitives, lighting information, and the like.

A problem exists however with the ability of prior art 3-D rendering architectures to scale to handle the increasingly complex 3-D scenes of today's applications. Computer screens now commonly have screen resolutions of 1920× 1200 pixels or larger. Traditional methods of increasing 3-D rendering performance, such as, for example, increasing clock speed, have negative side effects such as increasing power consumption and increasing the heat produced by the GPU integrated circuit die. Other methods for increasing performance, such as incorporating large numbers of parallel execution units for parallel execution of GPU operations have negative side effects such as increasing integrated circuit die size, decreasing yield of the GPU manufacturing process, increasing power requirements, and the like.

Thus, a need exists for a rasterization process that can scale as graphics application needs require and provide added performance without incurring penalties such as increased power consumption and/or reduced fabrication yield.

SUMMARY OF THE INVENTION

Embodiments of the present invention provide a method and system for deferred coverage mask generation in a raster stage of a graphics processor. Embodiments of the present invention implement a rasterization process that can scale as graphics application needs require and provide added performance without incurring penalties such as increased silicon die area, power consumption and/or reduced fabrication yield.

In one embodiment the present invention is implemented as a method for deferred coverage mask generation in a raster stage of a graphics processor. The method includes receiving a graphics primitive (e.g., triangle polygon) for rasterization in a raster stage of the graphics processor (e.g., GPU) and performing a bounding box test on the graphics primitive to define a bounding rectangle. A combined coverage mask is then generated after the completion of the bounding box test. The combined coverage mask indicates a plurality of pixels that are covered by the graphics primitive (e.g., those pixels that have at least some coverage from the graphics primitive). The combined coverage mask is divided into a plurality of sub-portions. In one embodiment, the sub-portions are allocated to a plurality of raster components for parallel rasterization to determine sub-pixel coverage for, the sub-portions.

In one embodiment, the bounding box test performed on the graphics primitive includes performing a scissors rectangle test, a viewpoint rectangle test, and a screen rectangle test. In one embodiment, a window clipping test on the graphics primitive and a depth cull test on the graphics primitive can be further performed prior to the generation of the combined coverage mask. Each of these tests comprise operations performed using rectangle constructs (e.g., as opposed to, for example, bit masks).

In one embodiment, a polygon stippling operation is performed on the graphics primitive prior to the generating of the combined coverage mask. Similarly, a window ID test can be performed on the graphics primitive prior to the generating of the combined coverage mask.

In this manner, embodiments of the present invention consolidate those operations which can reduce the scope of the pixel coverage (e.g., reduce the number of pixels turned on by the combined coverage mask) and implement such operations prior to the generation of the combined coverage mask. This increases the efficiency by reducing the number of components in which a coverage mask, or portions thereof, needs to be re-created, stored, and/or transmitted. The increased efficiency enables the rasterization process to readily scale in performance while minimizing penalties such as increased silicon die area, power consumption and/or reduced fabrication yield.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
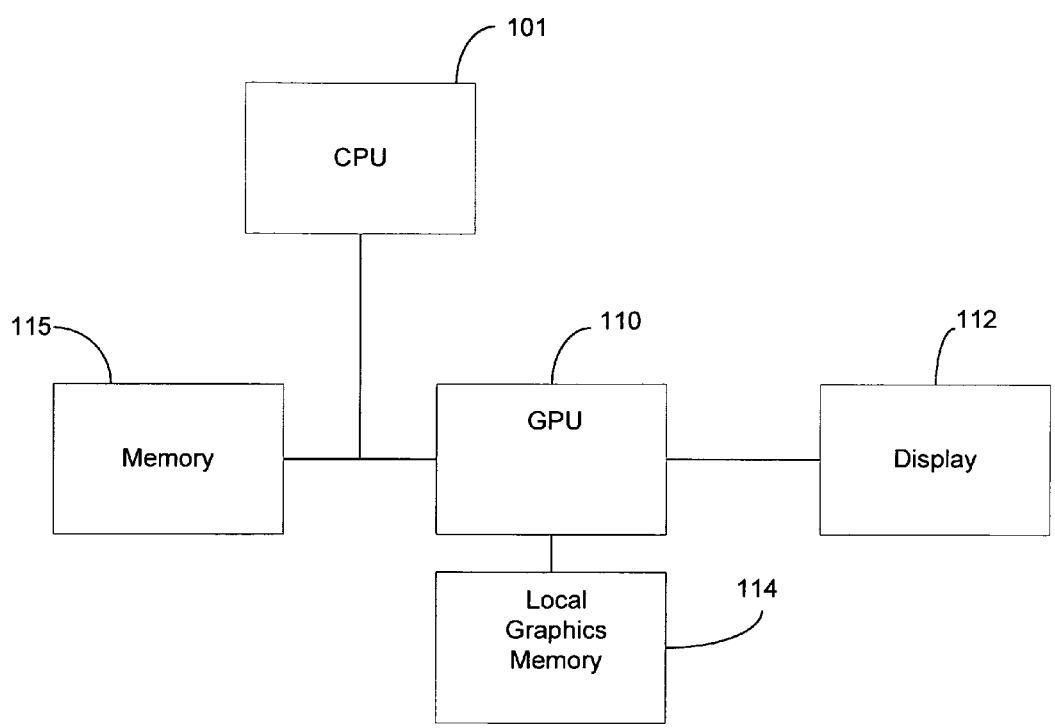
FIG. 1 shows a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Embodiments of the Invention

Embodiments of the present invention implement a method and system for deferred coverage mask generation in a raster stage of a graphics processor. The method includes receiving a graphics primitive for rasterization in a raster stage of a graphics processor and performing a bounding box test on the graphics primitive to define a bounding rectangle for the graphics primitive. A combined coverage mask is then generated after the completion of the bounding box test. The combined coverage mask indicates a plurality of pixels that are covered by the graphics primitive. The combined coverage mask is divided into a plurality of sub-portions. The sub-portions are allocated to a plurality of raster components to determine sub-pixel coverage for the sub-portions. Embodiments of the present invention and their advantages are further described below.

Figure 2:
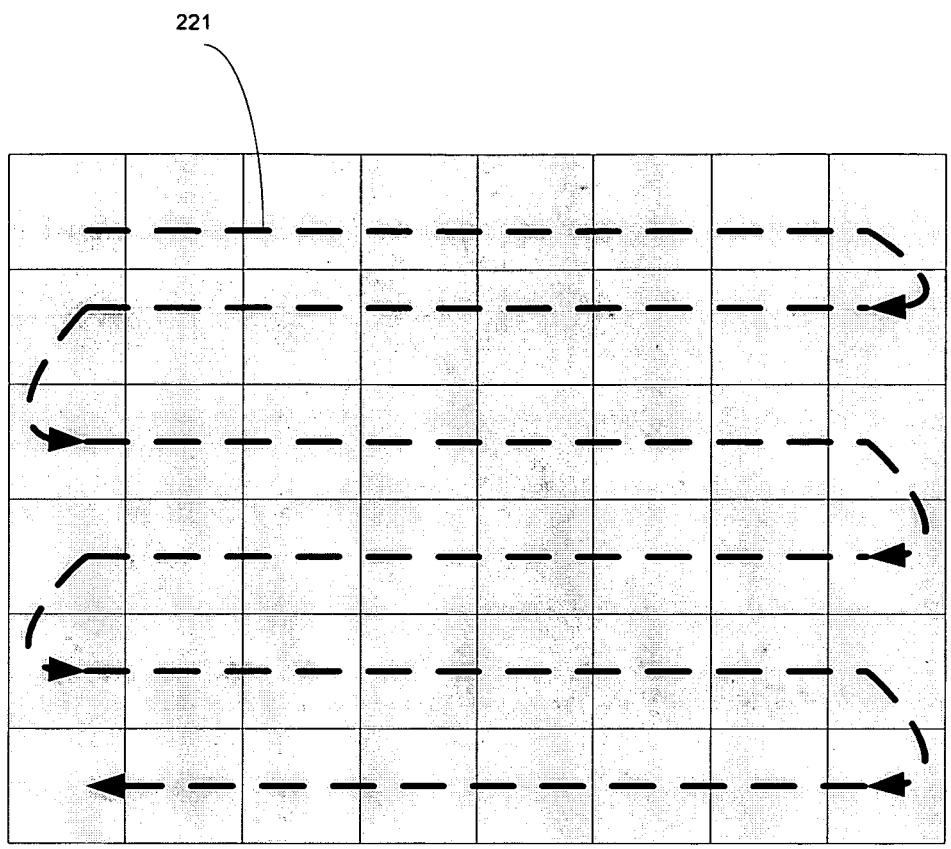
FIG. 2 shows a diagram depicting a grid of pixels being rasterized in a boustrophedonic pattern in accordance with one embodiment of the present invention.

FIG. 2 shows a diagram depicting a grid of pixels being rasterized in a boustrophedonic pattern in accordance with one embodiment of the present invention.

In one embodiment, as depicted in FIG. 2, a raster stage of the GPU 110 utilizes a boustrophedonic pattern for traversing a graphics primitive. As depicted in FIG. 2, the boustrophedonic pattern is indicated by the dotted line 221. In such an embodiment, each pixel of the grid of pixels is traversed in the order indicated by the line 221. The line 221 shows a boustrophedonic pattern of traversal, where the term "boustrophedonic" refers to a traversal pattern which visits all pixels on a 2D area by scanning back and forth along one axis as each pass moves farther along on the orthogonal axis, much as a farmer would plow or mow a field. The term boustrophedonic generally means "as the oxen plows" as in, for example, a field.

Thus, as depicted in FIG. 2, this boustrophedonic rasterization refers to a serpentine pattern that folds back and forth along a predominant axis. In the FIG. 2 example, the predominant axis is horizontal. A horizontal boustrophedonic sequence, for example, may generate all the pixels within a primitive triangle that are on one row from left to right, and then generate the next row right to left, and so on. Such a folded path ensures that an average distance from a generated pixel to recently previously generated pixels is relatively small. Additionally, it should be noted that the boustrophedonic traversal pattern can be implemented on a tile-by-tile basis (e.g., from a generated tile to a recently previously generated tile) as opposed to a pixel-by-pixel basis.

Referring still to FIG. 2, a boustrophedonic pattern for visiting the areas of the screen covered when rasterizing a large primitive (e.g., triangles, etc.) has advantages for maintaining a cache of relevant data and reducing the memory requests required for frame buffer and texture access. For example, generating pixels that are near recently generated pixels is important when recent groups of pixels and/or their corresponding texture values are kept in memories of a limited size (e.g., cache memories, etc.).

Additional details regarding boustrophedonic pattern rasterization can be found in US Patent Application "A GPU HAVING RASTER COMPONENTS CONFIGURED FOR USING NESTED BOUSTROPHEDONIC PATTERNS TO TRAVERSE SCREEN AREAS" by Franklin C. Crow et al., Ser. No. 11/304,904, filed on Dec. 15, 2005, which is incorporated herein in its entirety.

It should be noted that although embodiments of the present invention are described in the context of boustrophedonic rasterization, other types of rasterization patterns can be used. For example, the algorithms and GPU stages described herein for rasterizing tile groups can be readily applied to traditional left-to-right, line-by-line rasterization patterns.

Figure 3:
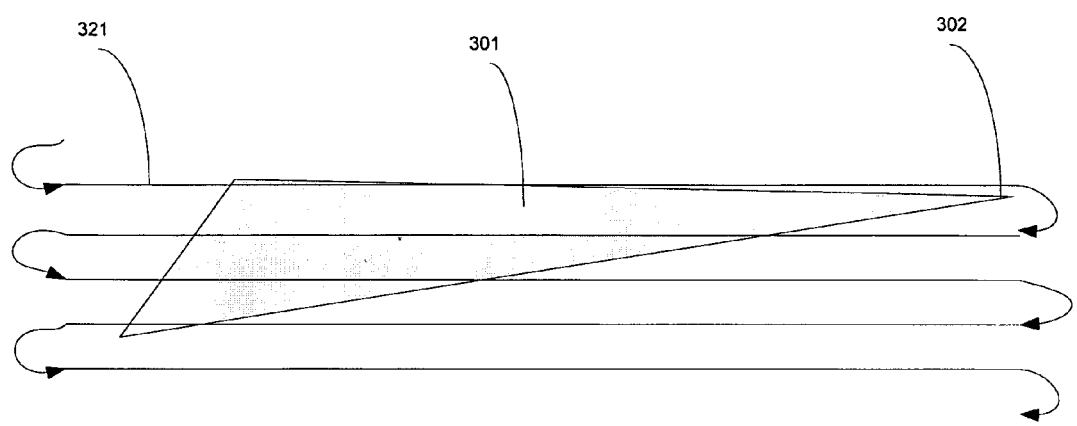
FIG. 3 shows a diagram of a triangle polygon against a rasterization pattern for a raster unit of the GPU in accordance with one embodiment of the present invention.

FIG. 3 shows a diagram of a triangle polygon 301 (e.g., triangle 301) against a rasterization pattern 321 for a raster unit of the GPU 110 in accordance with one embodiment of the present invention.

As described above, the line 321 shows a boustrophedonic pattern of traversal, where the raster unit visits all pixels on a 2D area of the triangle 301 by scanning along one axis as each pass moves farther along on the orthogonal axis. In the FIG. 3 embodiment, this initial rasterization pattern is performed at the first level, or at a coarse rasterization level. A coarse raster unit of the GPU 110 traverses the triangle 301 and stamps out tiles that cover the triangle 301.

Figure 4:
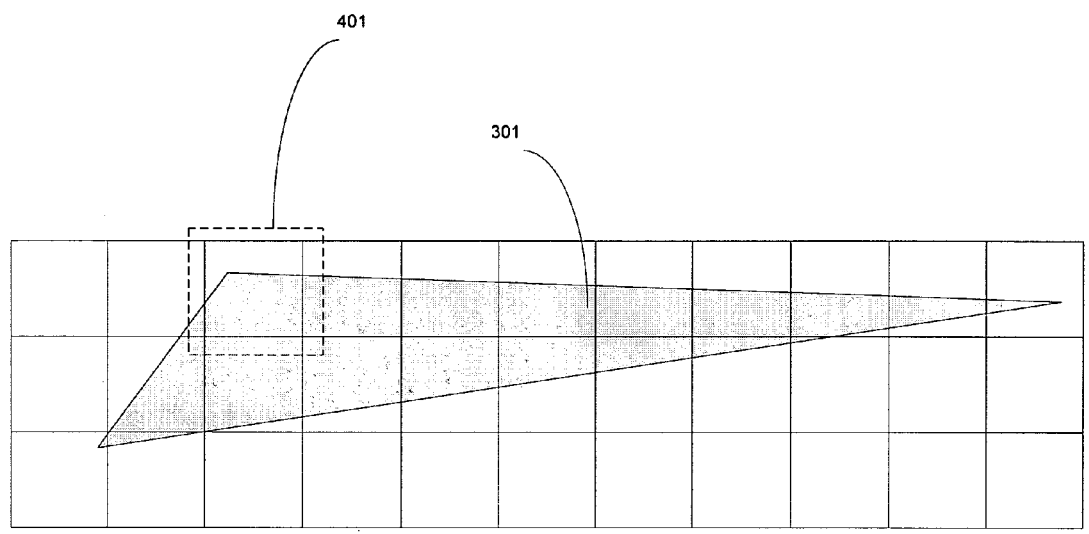
FIG. 4 shows a diagram of the triangle against a grid of tiles as they are examined by the first level rasterization process in accordance with one embodiment of the present invention.

FIG. 4 shows a diagram of the triangle 301 against a grid of tiles as they are examined by the first level rasterization process in accordance with one embodiment of the present invention. In FIG. 4, each of the illustrated squares, represents a tile comprised of pixels (e.g., 32×32, 16×16, etc.), such as the exemplary tile 401.

As described above, in one embodiment, the first level rasterization generates a tile (e.g., tile 401) comprising a set of pixels related to the graphics primitive (e.g., a tile that has at least some coverage with respect to the primitive). Generally, the first level rasterization is intended to quickly determine which pixels of the screen area relate to a given graphics primitive. Accordingly, relatively large groups of pixels (e.g., tiles) are examined at a time in order to quickly find those pixels that relate to the primitive. The process can be compared to a reconnaissance, whereby the coarse raster unit quickly scans a screen area and finds tiles that cover the triangle 301. Thus the pixels that relate to the triangle 301 can be discovered much more quickly than the traditional prior art process which utilizes a single level of rasterization and examines much smaller numbers of pixels at a time, in a more fine-grained manner.

Figure 5:
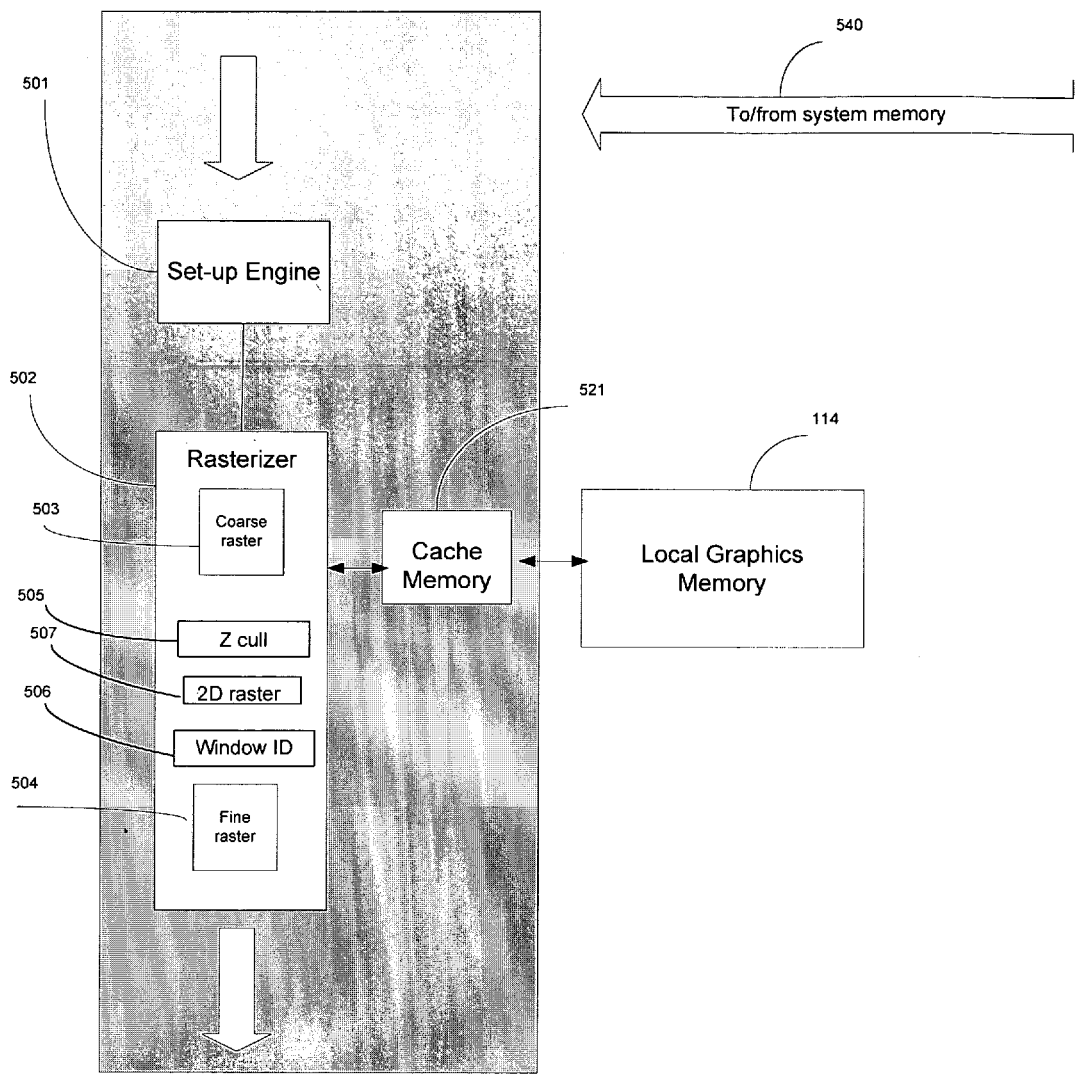
FIG. 5 shows a diagram of internal components of the GPU in accordance with one embodiment of the present invention.

FIG. 5 shows a diagram of internal components of the GPU 110 in accordance with one embodiment of the present invention. As shown in FIG. 5, the GPU 110 includes a setup unit 501 and a raster unit 502. In the present embodiment, the functionality of the present invention is implemented within the hardware and software of the raster unit 502. Generally, the set up unit 501 functions by converting descriptions based on vertices to descriptions based on edge descriptions. The raster unit 502 subsequently converts these edge descriptions into filled areas comprising actual pixel descriptions (e.g., pixel areas, pixel sub-samples, etc.). The pixel descriptions are subsequently passed along to other units within the GPU 110 for further processing and rendering.

In the FIG. 5 embodiment, the raster unit 502 includes a coarse raster component 503, a depth cull component 505, a window ID component 506, a 2-D raster component 507, and a fine raster component 504. The coarse raster component 503 implements the tile based rasterization process as described above, as it rapidly searches a grid of tiles to identify tiles of interest (e.g., tiles that are covered by a primitive). The depth cull component 505, sometimes referred to as the Z cull component, examines the tiles identified by the coarse raster component 503 and functions by discarding, or culling, the pixels comprising those portions of the graphics primitive that are covered by, or are otherwise included in, other graphics primitives. Such portions will ultimately not be displayed and should not be further processed. The 2-D raster component 507 functions during non-3D related processing operations of the GPU 110.

The window ID component 506 examines the tiles identified by the coarse raster component 503 and functions by turning off/on those pixels that are associated with a given window of interest. Such a window could comprise, for example, one of several windows on a computer screen as displayed by one or more applications, were each window is associated with a designated window identifier (e.g., window ID) as described in, for example, the OpenGL specification.

The window ID component 506 compiles per pixel information into a coverage mask which defines whether the individual pixels of the tile are on/off. The window ID component 506 further operates by generating a combined coverage mask which further incorporates the information from the depth cull component 505 with respect to which pixels of the tile are turned on/off.

In one embodiment, the window ID component 506 can determine which sub-portions of a tile identified by the coarse raster unit are turned off and can discard those sub-portions. This reduces the amount of work that must be performed by the fine raster component 504. For example, in a case where the coarse raster component 503 works with tiles comprising 1024 pixels (e.g., a 32×32 block of pixels), the tile can be subdivided into, for example, 16 sub-portions of 64 pixels each (e.g., 8×8 blocks of pixels). Those sub-portions having all of their constituent pixels turned off as indicated by the combined coverage mask can be completely discarded. Those sub-portions having at least some coverage are passed on to the fine raster component 504. The functionality of the window ID component 506 is further described in FIG. 6 below.

Once the related tiles are identified by the coarse raster component 503, and those sub-portions of the tile that are turned off are discarded by the window ID component 506, the fine raster component 504 examines each of the sub-portions and individually identifies the pixels that are covered by the primitive. Hence, in such an embodiment, the coarse raster component 503 rapidly searches a grid of pixels by using tiles, and the fine raster component 504 uses the information generated by the coarse raster component 503 and implements fine granularity rasterization by individually identifying pixels covered by the primitive. In one embodiment, the fine raster component 504 can implement subpixel coverage by examining subpixel sample points within each pixel.

Referring still to FIG. 5, the GPU 110 further includes a cache memory 521 that functions by implementing high-speed low latency storage for the most frequently used graphics rendering data. Such data typically comprises texture information, vertex information, colors, and the like. The cache memory 521 is shown coupled to the local graphics memory 114. The cache memory 521 utilizes one or more cache maintenance mechanisms to maintain coherency with the local graphics memory 114. The arrow 540 shows the communications pathway between the GPU 110 and the system memory (e.g., memory 115 shown in FIG. 1).

In one embodiment, the hardware comprising the raster unit 502 is optimized for operations on a per clock basis. For example, to provide high throughput and thereby maintain high rendering frame rates, the coarse raster component 503 and the fine raster component 504 comprise hardware designed to implement the first level rasterization and the second level rasterization on a per-clock cycle basis. The raster unit 502 can be implemented such that the first level rasterization is implemented in the coarse raster component 503 that "stamps out" tiles covering a given primitive within a single clock cycle. Subsequently, the rasterization at the second level can be implemented in the fine raster component 504 that stamps out the covered pixels of a tile in a single clock cycle.

In one embodiment, the first level rasterization is performed by the coarse rasterization component 503 and the related sub-portions are output for rasterization at a second-level at the fine raster component 504. In this manner, embodiments of the present invention provide a method and system for a rasterization process that can scale as graphics application needs require and provide added performance without incurring penalties such as increased power consumption and/or reduced fabrication yield.

Figure 6:
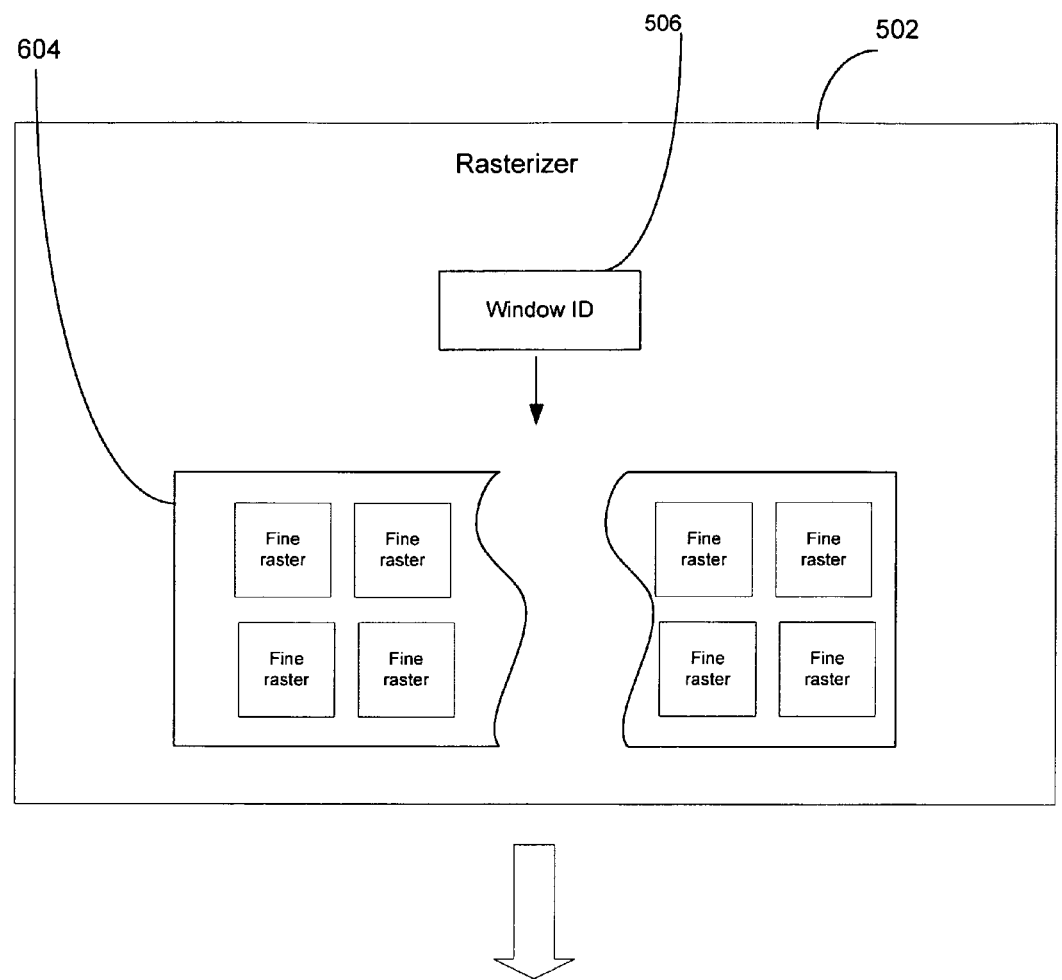
FIG. 6 shows the raster unit in accordance with one embodiment of the present invention, wherein the raster unit includes an array of parallel fine raster units.

FIG. 6 shows the raster unit 502 in accordance with one embodiment of the present invention, wherein the raster unit includes an array 604 of parallel fine raster components. FIG. 6 depicts a case where the multiple sub-portions comprising a tile are allocated to the individual fine raster components comprising the array 504. The individual fine raster components of the array 504 then perform a parallel "fine-grained" rasterization on their allocated sub-portions to identify individual pixels that are covered by the graphics primitive, or to determine subpixel coverage by the graphics primitive.

Additional descriptions regarding parallel fine rasterization can be found in the commonly assigned United States Patent Application "a method for PARALLEL FINE RASTERIZATION in a raster stage of a graphics pipeline" by Walt Steiner, et al., filed on Jun. 23, 2006, Ser. No. 11/474,027, which is incorporated herein in its entirety.

Figure 7:
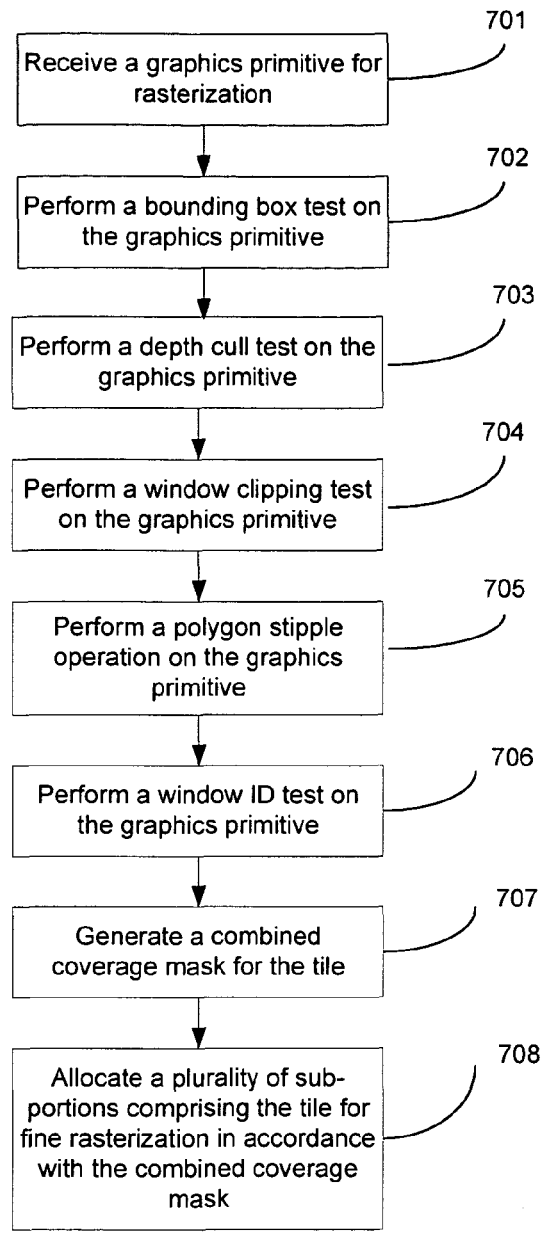
FIG. 7 shows a flowchart of the steps of a process in accordance with one embodiment of the present invention.

FIG. 7 shows a flowchart of the steps of a process 700 in accordance with one embodiment of the present invention. As shown in FIG. 7, process 700 illustrates the operating steps of a deferred coverage mask generation method as implemented in a raster unit (e.g., raster unit 502) of a GPU (e.g., GPU 110).

Generally, as described above, one of the major functions of the raster unit 502 is to identify which pixels are covered by given primitive and which pixels are not. In addition to determining which pixels are covered, an additional function of the raster unit 502 is to identify which pixels of a given tile are to be turned off regardless of coverage. This information is contained in a coverage mask, which generally comprises a data structure where each pixel is represented by a bit. For example, a 1024 pixel tile as described above would have a corresponding coverage mask of at least 1024 bits. The bits each indicate whether their corresponding pixels (or sample points) are on or off.

In one embodiment, the information regarding coverage by a graphics primitive and whether or not, regardless of coverage, a given pixel of a tile is on/off is compiled into a combined coverage mask that is generated in the window ID component 506. In accordance with embodiments of the present invention, the generation of this combined coverage mask is delayed until the various tests and evaluations that go into determining the on-off status of the pixels are performed.

Generation of the combined coverage mask is subsequent to coarse rasterization, a number of bounding box tests, depth culling, window ID, and stipple operations. Each of the above operations typically function by turning off pixels (e.g., "killing pixels") which would otherwise be turned on due to their coverage by the graphics primitive. The concentration of a number of these pixel killing functions within the window ID unit 506 provides a number of advantages.

For example, by deferring the generation of the combined coverage mask until the window ID component 506, the raster unit 502 can implement a more efficient hardware algorithm. The raster unit 502 is not required to send as many coverage mask. bits down its pipeline from, for example, the coarse raster component 503, the Z cull component 505, and the like. In comparison to prior art, a typical prior art implementation would have to send at least 1024 bits (e.g., for a 32×32 tile) through all of these components to a window ID component. In contrast, in the FIG. 5 embodiment, only the descriptions of the rectangles comprising the various tests are sent through. The coverage mask is not generated until operations take place within the window ID component 506. Additionally, embodiments of the present invention can defer polygon stippling and window clipping tests for execution within the window ID unit (e.g., instead of performing such tests in the coarse raster 503).

Referring now to process 700 of FIG. 7, process 700 begins in step 701, where a graphics primitive is received for rasterization in a raster unit (e.g., raster unit 502). As described above, the graphics primitive is rasterized by the coarse raster component 503 against a set of tiles to determine those tiles that are related to the primitive (e.g., have at least some coverage from the primitive).

In step 702, using the tile determined by the coarse raster component 503, a bounding box test is performed on the graphics primitive. In one embodiment, the bounding box test generates a bounding box rectangle that is superimposed on the graphics primitive. The bounding box rectangle incorporates a scissors rectangle test, a viewport rectangle test, and a screen rectangle test. All of these rectangles are combined to produce a bounding box mask, which is usually a rectangle, and which is used to turn off those bits that are outside the bounding box mask.

In step 703, a depth cull test is performed on the graphics primitive. The depth cull test is performed by a depth cull unit. As described above, the Z cull component 505 examines the tiles and culls the pixels comprising those portions of the graphics primitive that are covered by or are otherwise included in other graphics primitives. Such portions will ultimately not be displayed and should not be further processed. This information is transmitted to the window ID unit 506 for incorporation into the combined coverage mask.

In step 704, a window clipping test is performed on the graphics primitive. The window clipping tests generally comprise using a number of window rectangles that generate windows for applications on a display screen to turn off pixels that are outside of a given window or are covered by a given window. The window clipping test can be inclusive (e.g., pixels inside any of window rectangles are turned on) or exclusive (e.g., pixels inside any of the window rectangles are turned off).

In step 705, a polygon stipple operation is performed on the graphics primitive. The polygon stipple operation typically involves the use of a polygon stipple mask, where a user specified pattern is mapped onto the primitive being rendered. The pattern indicates which pixels should be turned off/on.

In step 706, a window ID test is performed on the graphics primitive. Window ID information is specified at the per pixel level. For each pixel of the combined coverage mask, a corresponding window ID number is associated therewith (e.g., 8 bit window ID, or the like). In one embodiment, the window ID function with regard to the use of the window ID number is in accordance with the OpenGL specification.

In step 707, the results of the operations from steps 702-706 are used to generate a combined coverage mask that reflects of the results of the above operations. Subsequently, in step 708, the tile is divided into a plurality of sub-portions and each of these the sub-portions are allocated to the fine raster component 504. In one embodiment, an array of fine raster components are used (e.g., array 604) and the resulting sub-portions are allocated among the fine raster components of the array for parallel fine rasterization.

In this manner, the deferral of the generation of the combined coverage mask and the concentration of a number of pixel killing functions into the window ID unit 506 provides a number of advantages. As described above, the raster unit 502 can implement a more efficient hardware algorithm by not sending as many coverage mask bits down its pipeline. Additionally, the window ID unit 506 can eliminate a number of sub-portions which are completely turned off prior to the point where individual sub-portions are allocated to the parallel fine raster components. Thus if an entire tile sub-portion is "killed" by the combination of pixel kill functions, it need not be allocated. This results in a further savings in the number of bits that need to be transmitted. Additionally, this saves the expense of replicating the window ID functionality in a number of different fine raster components. Performing the window ID functionality in a single component prior to dispatching multiple sub-portions to respective multiple fine raster components yields a much more efficient raster architecture.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for deferred coverage mask generation in a raster stage of a graphics processor, comprising:
receiving a graphics primitive for rasterization in a raster stage of a graphics processor;
performing a bounding box test on the graphics primitive to define a bounding rectangle for the graphics primitive, wherein the bounding box test further includes performing a scissors rectangle test on the graphics primitive; and
generating a combined coverage mask after the completion of the bounding box test, wherein the combined coverage mask indicates a plurality of pixels that are covered by the graphics primitive and after coarse rasterization, depth culling, window ID, and stipple operations.

2. The method of claim 1, wherein the bounding box test further comprises:
performing a viewport rectangle test on the graphics primitive.

3. The method of claim 2, wherein the bounding box test further comprises:
performing a screen rectangle test on the graphics primitive.

4. The method of claim 1, performing a depth cull test on the graphics primitive prior to the generating of the combined coverage mask.

5. The method of claim 1, further comprising:
performing a window clipping test on the graphics primitive prior to the generating of the combined coverage mask.

6. The method of claim 1, further comprising:
performing a polygon stippling operation on the graphics primitive prior to the generating of the combined coverage mask.

7. The method of claim 1, further comprising:
performing a window ID test on the graphics primitive prior to the generating of the combined coverage mask.

8. The method of claim 7, wherein the window ID test is in accordance with a version of the OpenGL specification.

9. The method of claim 1, further comprising:
dividing the combined coverage mask into a plurality of sub-portions; and
allocating the sub-portions to a plurality of raster components to determine sub-pixel coverage for the sub-portions, wherein the plurality of raster components for determining subpixel coverage are fine raster components, and wherein a coarse raster component rasterizes the graphics primitive to generate a plurality of tiles of pixels related to the graphics primitive.

10. A GPU (graphics processor unit), comprising:
a set-up unit for generating polygon descriptions;
a raster unit coupled to the set-up unit for rasterizing the polygon descriptions;

a coarse raster component within the raster unit for rasterizing a graphics primitive at a first level to generate a plurality of tiles of pixels related to the graphics primitive;

a coverage mask generation unit within the raster unit for generating a combined coverage mask after completion of a bounding box test, wherein the combined coverage mask indicates a plurality of pixels that are covered by the graphics primitive, and for dividing the combined coverage mask into a plurality of sub-portions, wherein a window ID component is configured for performing a window clipping test on the graphics primitive prior to the generating of the combined coverage mask and after coarse rasterization, depth cuffing, window ID, and stipple operations; and a plurality of fine raster components coupled to receive the sub-portions as allocated by the coverage mask generation unit and to determine sub-pixel coverage for the sub-portions.

11. The GPU of claim 10, further comprising:
a 2-D raster component included within the raster unit, wherein the generation of the combined coverage mask is configured to hide a latency of the 2-D raster component.

12. The GPU of claim 10, further comprising:
a depth cull component included within the raster unit and configured for performing a depth cull test on the graphics primitive prior to the generating of the combined coverage mask.

13. The GPU of claim 10, wherein the coverage mask generation unit is configured to perform a window ID test on the graphics primitive prior to the generating of the combined coverage mask.

14. The GPU of claim 10, wherein the window ID test is in accordance with a version of the OpenGL specification.

15. A method for deferred coverage mask generation in a raster stage of a graphics processor, comprising:
receiving a graphics primitive for rasterization in a raster stage of a graphics processor;
rasterizing the graphics primitive at a first level to generate a plurality of tiles of pixels related to the graphics primitive; and
performing a bounding box test on the graphics primitive to define a bounding rectangle for the graphics primitive, wherein the bounding box test includes a scissors rectangle test, a viewpoint rectangle test, and a screen rectangle test;
performing a window clipping test on the graphics primitive;
performing a depth cull test on the graphics primitive;
subsequent to the bounding box test, the window clipping test, and the depth cull test, and the screen rectangle test, generating a combined coverage mask, wherein the combined coverage mask indicates a plurality of pixels of the tiles that are covered by the graphics primitive, wherein a window ID test is performed on the graphics primitive prior to the generating of the combined coverage mask;
dividing the combined coverage mask into a plurality of sub-portions; and
allocating the sub-portions to a plurality of fine raster components to determine sub-pixel coverage for the sub-portions.

16. The method of claim 15, further comprising:
performing a polygon stippling operation on the graphics primitive prior to the generating of the combined coverage mask.

17. The method of claim 15, wherein the window ID test is in accordance with a version of the OpenGL specification.

* * * * *